(12) United States Patent
Wörner et al.

(10) Patent No.: US 7,247,280 B2
(45) Date of Patent: Jul. 24, 2007

(54) MULTI-BED CATALYZER

(75) Inventors: Siegfried Wörner, Esslingen (DE);
Georg Wirth, Kirchheim/Teck (DE);
Ulrich Sigel, Plochingen (DE); Markus Alles, Spiesen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 647 days.

(21) Appl. No.: 10/683,755

(22) Filed: Oct. 10, 2003

(65) Prior Publication Data

US 2004/0105792 A1 Jun. 3, 2004

(30) Foreign Application Priority Data

Nov. 20, 2002 (DE) ................. 102 54 036
Jan. 15, 2003 (DE) ................. 103 01 233

(51) Int. Cl.
*B01D 50/00* (2006.01)

(52) U.S. Cl. .............. 422/179; 422/177; 422/180

(58) Field of Classification Search ............. 422/177, 422/179, 180
See application file for complete search history.

(56) References Cited

U.S. PATENT DOCUMENTS

| | | | | |
|---|---|---|---|---|
| 3,854,888 A | * | 12/1974 | Frietzsche et al. | .......... 422/171 |
| 4,278,639 A | * | 7/1981 | Tadokoro et al. | .......... 422/171 |
| 4,864,095 A | | 9/1989 | Yamashita et al. | |
| 6,001,314 A | * | 12/1999 | Buck et al. | .......... 422/177 |
| 6,447,735 B1 | | 9/2002 | Yamanashi et al. | |

FOREIGN PATENT DOCUMENTS

| | | |
|---|---|---|
| DE | 2442488 | 3/1976 |
| DE | 3729994 A1 | 3/1989 |
| DE | 4024015 A1 | 2/1992 |
| DE | 19511503 A1 | 7/1996 |
| DE | 196 27 289 | 12/1997 |
| DE | 196 26 692 | 1/1998 |
| DE | 19753196 A1 | 7/1999 |
| EP | 0 283 913 B1 | 3/1988 |
| FR | 2 333 950 | 1/1974 |
| JP | 56002420 | 12/1981 |
| JP | 61274829 | 5/1986 |

* cited by examiner

*Primary Examiner*—Glenn A. Caldarola
*Assistant Examiner*—Tom P. Duong
(74) *Attorney, Agent, or Firm*—Collard & Roe, P.C.

(57) ABSTRACT

A multibed catalyzer (1) is for an exhaust system of a combustion engine, of a motor vehicle. In a housing (2), at least two catalytic monoliths (3, 4) are arranged axially adjacent to be flowed-through in succession. The two monoliths (3, 4) are encased on the circumferential side by a common heat-resistance bearing mat (5) and supported by means of this bearing mat (5) in the housing (2). In order to enable a predetermined axial minimal distance between the two monoliths (3, 4), at least two heat-resistant distancing elements (9) are distributed circumferentially and axially between the two monoliths (3, 4), so that the monoliths are axially supported on one another by means of the distancing elements (9).

16 Claims, 3 Drawing Sheets

MULTI-BED CATALYZER

The present invention relates to a multi-bed catalyzer for an exhaust gas system of a combustion engine, in particular, of a motor vehicle.

A multi-bed catalyzer has multiple catalytic monoliths, which are arranged behind one another in the axial direction and in operation, are flowed-through with current in succession. For example, a two-bed catalyzer contains two monoliths.

For certain uses, it can be necessary to secure an axial minimal distance between two adjacent monoliths, for example, in order to mount a testing probe there.

The present invention addresses the problem of providing an improved embodiment for a multi-bed catalyzer of the above-described type, which, in particular, makes possible a permanent, axial minimal distance between two adjacent monoliths.

This problem is solved according to the subject matter of the independent patent claims. Advantageous embodiments are the subject matter of the dependent patent claims.

The present invention relates to the general idea of supporting adjacent monoliths with the aid of suitable distancing, or spacing, elements from one another in the axial direction. In this manner, a desired minimal distance between the monoliths can be maintained. These types of distancing elements can be built-in simultaneously with comparable minimal expense upon insertion of the monoliths into a housing of the multi-bed catalyzer. Housing-side features are therefore not required, so that the expense to realize the multi-bed catalyzer of the present invention is similarly minimal.

Of particular advantage in this connection is the supporting of both monoliths with the assistance of a common bearing mat, whereby the assembly of the multi-bed catalyzer is substantially simplified.

One embodiment is practical in which the distancing elements respectively are formed by means of a wire web made from a heat-resistant wire. This construction has many advantages. For one, such wire web distancing elements can be elastically resilient, so that the monoliths, which typically comprise a brittle ceramic, support one another elastically via the distancing elements, whereby the danger of damage to the monolith is reduced. For another, such wire web distancing elements elastically compensate heat expansion effects, without the occurrence of excessively large tensioning strain. In addition, such wire web distancing elements are suited for thermal insulating support of the monoliths on the housing, whereby "hot-spots", or high-temperature zones, on the housing can be avoided.

According to another embodiment, the bearing mat for each distancing element can have a recess, in which the respective distancing element is arranged and from which the respective distancing element extends radially, axially inward between the monoliths. This construction simplifies assembly, since, for one, the distancing elements can be used when the bearing mat already encases the monoliths. For another, the desired peripheral distribution of the distancing elements can be provided via the positioning of the recesses, which simplifies an orderly positioning of the distancing elements for the respective assembler.

Further important features and advantages of the invention are provided in the dependent claims, from the figures, and from the associated description of the figures with reference to the figures.

It is understood that the previously described features and the features to be described subsequently can be used not only in the respective, provided combination, but also in other combinations or individually, without abandoning the frame of the present invention.

A preferred embodiment of the invention is shown in the drawings and is described in greater detail in the following description, whereby the same reference numerals designated the same or functionally equal or similar components.

In the drawings, each schematically,

Figure 5:
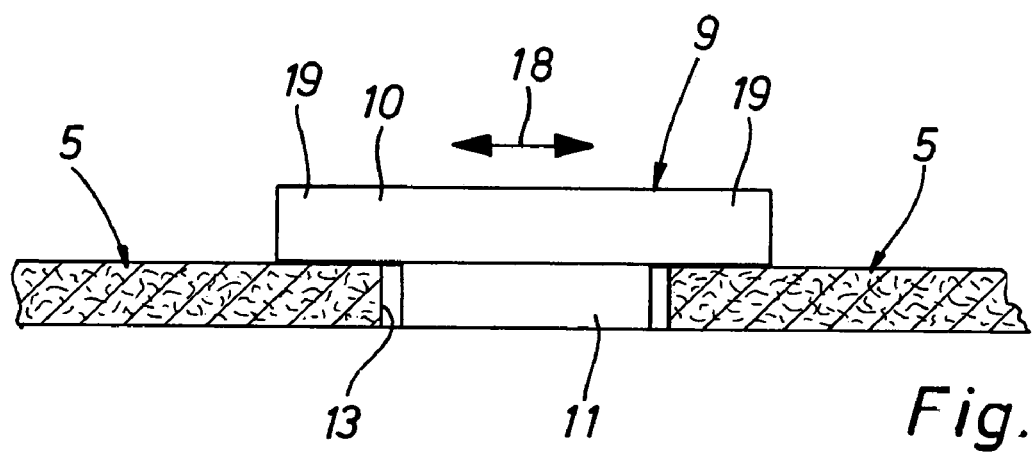
Figure 6:
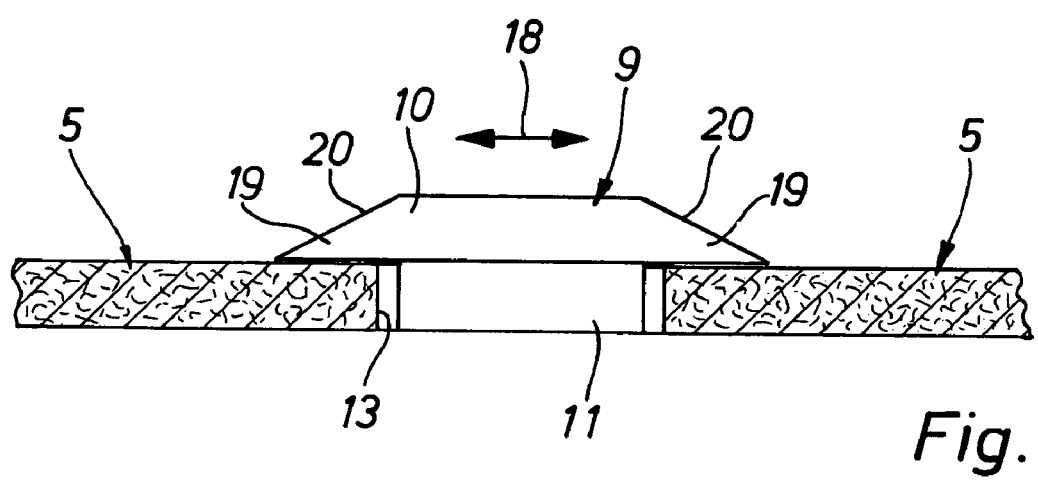

FIG. 5 a partially cutaway side view of a bearing mat in the area of a spacer in a special embodiment; and FIG. 6 a view like FIG. 5, but of another embodiment.

According to FIGS. 1 through 4, a multi-bed catalyzer 1 of the present invention includes a housing 2, in which multiple, here two, monoliths 3, 4, are accommodated. Since the multi-bed catalyzer in the present example has only two monoliths 3, 4, this can also be designated as a two-bed catalyzer. The monoliths 3, 4 have an appropriate circular-cylindrical body.

Figure 2:
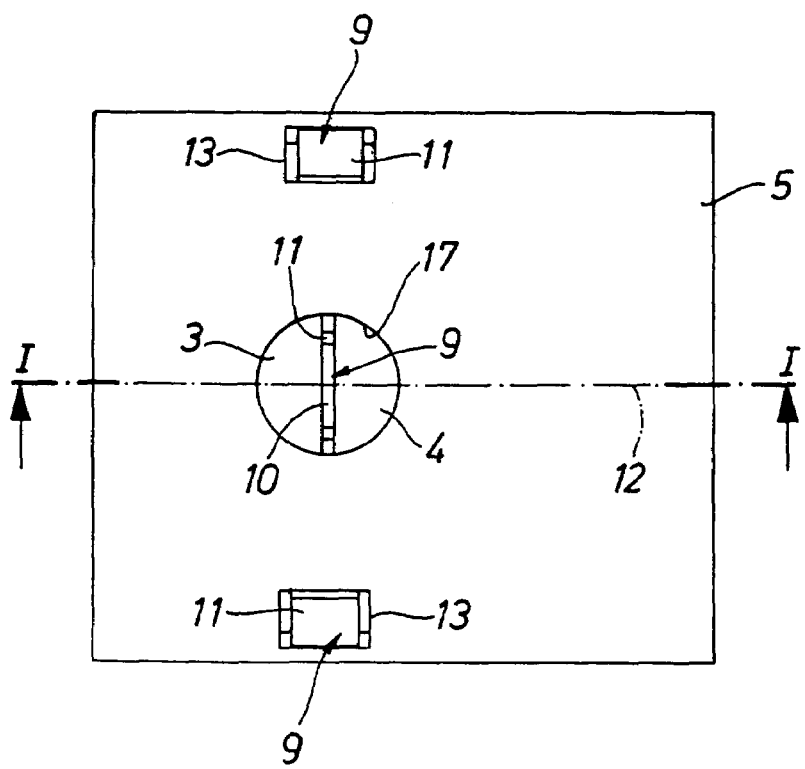
FIG. 2 shows a plan view of a multi-bed catalyzer of FIG. 1, corresponding to a view arrow II in FIG. 1.
Figure 4:
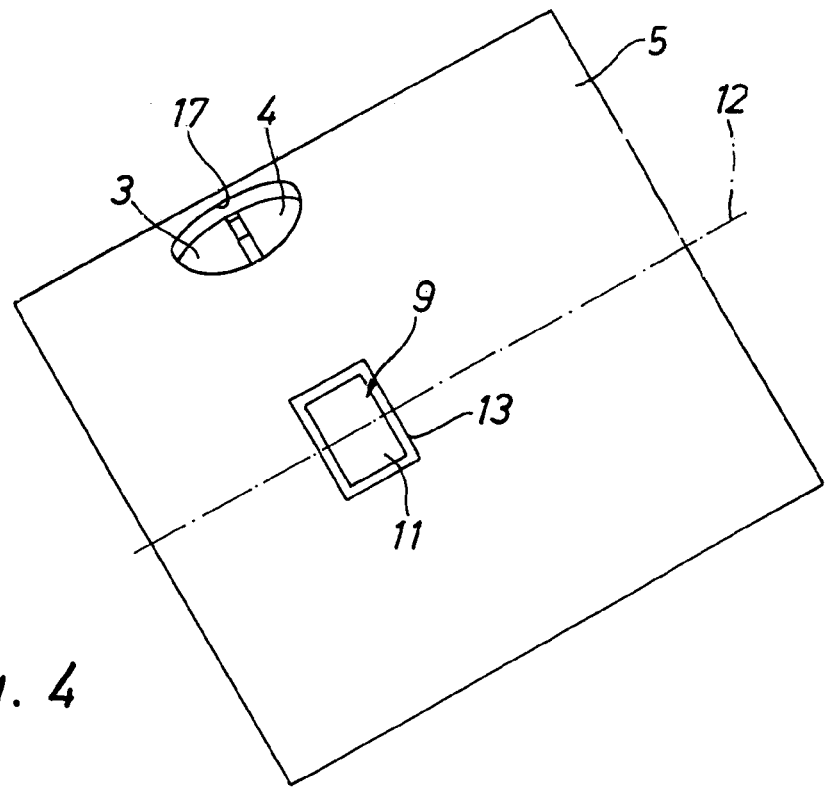
FIG. 4 shows a plane view of a multi-bed catalyzer, corresponding to a view arrow IV in FIG. 3.

In the view of FIGS. 2 and 4, the housing 2 is omitted for better comprehension.

The two monoliths 3, 4 are formed as catalyzer elements, that is, they operate catalytically.

Preferably, such a multi-bed 1 is used in an exhaust system of a combustion engine, in particular, of a motor vehicle.

For supporting the two monoliths, 3, 4 in the housing 2, a common bearing mat 5 is provided, which is arranged radially between the monoliths 3, 4, and the housing 2. The bearing mat 5 comprises a heat-resistant material and encases both monoliths 3, 4 on their circumferences. When installed, both monoliths 3, 4, are braced radially over their common bearing mat 5 on the housing 2. The bearing mat 5 serves on the one hand for thermal insulation of the housing 2 relative to the monoliths 3, 4. On the other hand, the impact-sensitive monoliths 3, 4, which typically are made from a brittle ceramic, are embedded softly in the bearing mat 5. In other words, vibrations of the multi-bed catalyzer 1, which can occur in operation, are damped by the bearing mat 5.

Both monoliths 3, 4, are thereby arranged behind one another in the housing 2, with reference to a flow-through direction, so that in operation of the multi-bed catalyzer 1, they are flowed-through in succession.

The two monoliths 3, 4 are axially spaced from one another on axial front sides 6, 7, facing one another, so that a gap 8 is formed between the two monoliths 3, 4. In the area of this gap 8, multiple, here three, distancing elements 9 are arranged axially between the two monoliths 3, 4, such that the two monoliths 3, 4, are axially supported on one another by the distancing elements 9. The distancing elements 9 ensured therewith a predetermined axial minimal distance between the two monoliths 3, 4. The distancing elements 9 are arranged distributed along the circumference of the monoliths 3, 4, preferably, symmetrical. The distancing elements 9 comprise a heat-resistant material, so that they can withstand the operating conditions, in particular, the operating temperature, of the multi-bed catalyzer 1.

The distancing elements 9 arranged on the periphery of the monoliths 3, 4, are dimensioned appropriately such that they can be supported radially outward on the housing 2.

Figure 1:
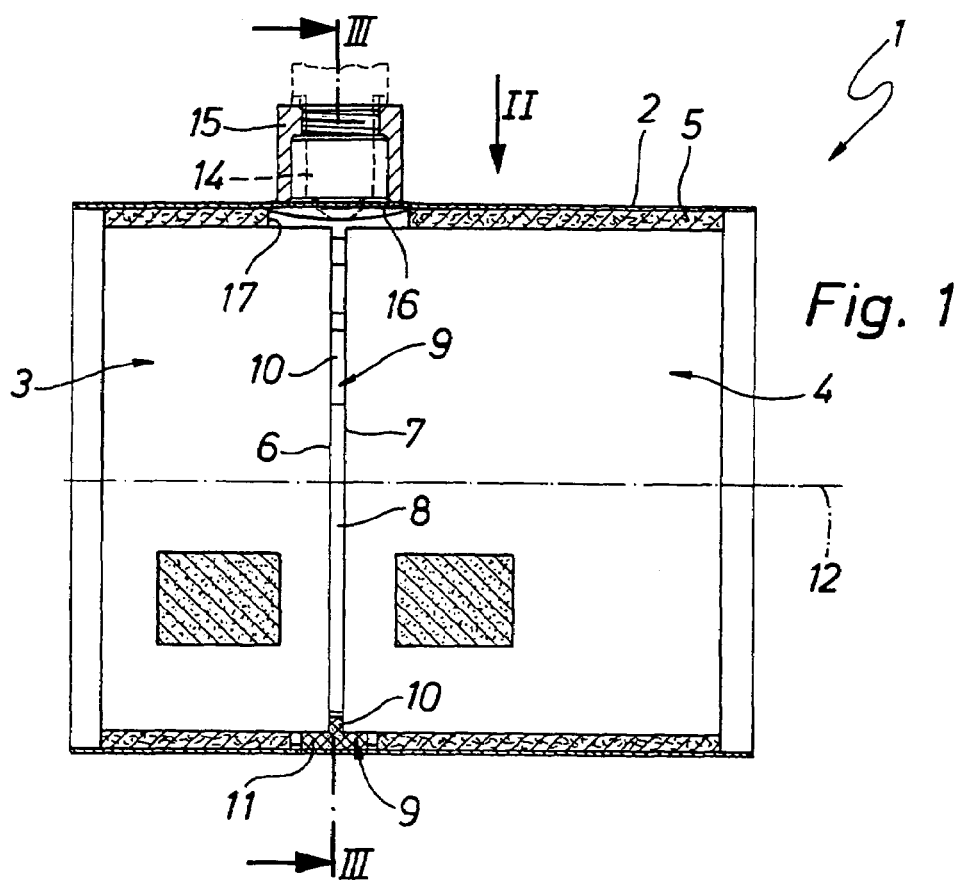
FIG. 1 shows an axial longitudinal section through a multi-bed catalyzer of the present invention along corresponding section lines I in FIG. 2.

The distancing elements 9 are formed here, such that they have a T-shaped axial cross section (see FIG. 1). Basically, other desired, suitable cross sections are possible, for example, an L-shaped cross section. In particular, with an L-shaped or with a T-shaped cross section, as shown here, each distancing element 9 has a distancing section 10 and a retaining section 11. The distancing elements 9 are thereby arranged radially outward on the monoliths 3, 4, whereby the respective distancing section 10 extends radially inward axially between the monoliths 3, 4. The distancing sections 10 affect therewith the maintenance of the desired minimal distance between the two monoliths 3, 4. In contrast thereto, the retaining sections 11 each connected to an associated distancing section 10 and overlap both monoliths 3, 4 radially outward in the axial direction with a T-shaped cross section and with an L-shaped cross section, only one of the monoliths 3, 4. The retaining sections 11, therefore, are dimensioned such that they contact the housing 2 radially, so that the monoliths 3, 4 are supported radially on the housing 2 in the area of the gap 8, also by means of the retaining sections 11 of the distancing elements 9.

According to a preferred embodiment, the distancing elements 9 each are formed as a wire web, whereby a suitable, heat-resistant wire is used for its manufacture. The wire web of the distancing elements 9 is formed, such that the distancing elements 9, on the one hand, ensure the desired minimal distance between the two monoliths 3, 4 in all operating states of the multi-bed catalyzer 1, and on the other hand, are elastically resilient in order to compensate heat-expansion effects. At the same time, the wire web can be formed, such that it provides a sufficient thermal insulation between the housing 2 and the monoliths 3, 4.

Figure 3:
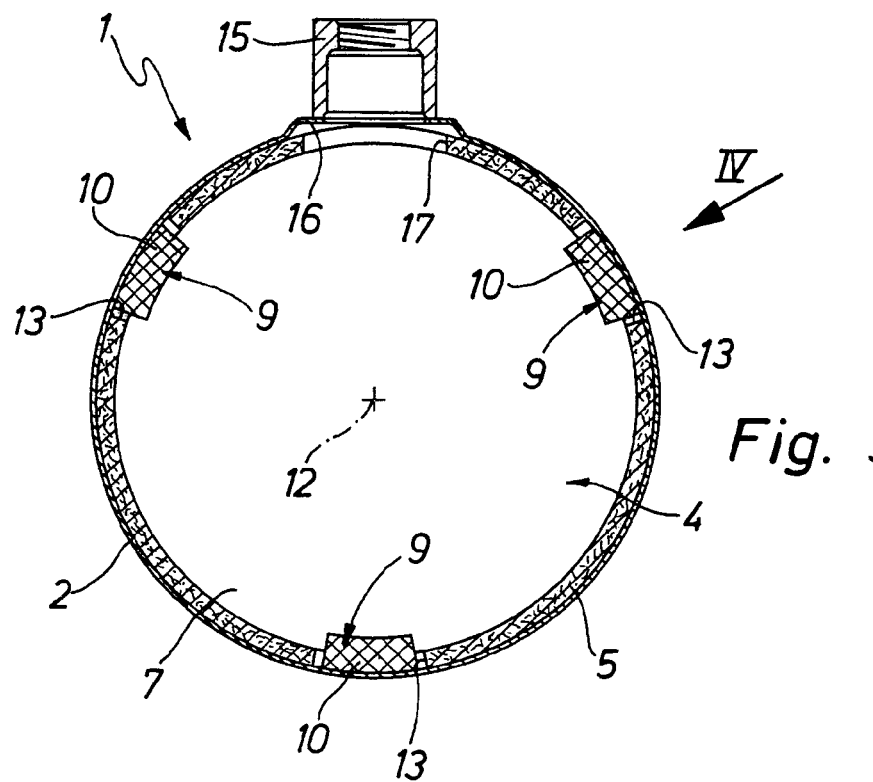
FIG. 3 shows a cross section through the multi-bed catalyzer, corresponding to section lines III in FIG. 1.

As can been seen particularly well in FIG. 3, the distancing elements 9 can be adapted to the circular-cylindrical shape of the monoliths 3, 4, so that they are formed as circular arc segments with reference to a longitudinal center axis 12 of the monoliths 3, 4, in particular, with an angle of arc of approximately 20°. As far as the distancing elements 9 being formed as webs, they can be shaped accordingly upon mounting, so that they need not be pre-formed.

With the preferred embodiments shown here, the bearing mat 5 for each distancing element 9 has a recess 13, in which the respective distance element 9 penetrates radially into the bearing mat 5. In this manner, it is possible, for example, first to insert the distancing elements 9 upon assembly of the multi-bed catalyzer, if the bearing mat 5 already encases the two monoliths 3, 4. At the same time, the predetermined, for example, stamped-out recesses 13, define the optimal positions for the distancing elements 9. One embodiment, in which the distancing elements 9 are already mounted on the bearing mat 5, before the monoliths 3, 4 are inserted into the bearing mat is preferred.

To this purpose, the recesses 13 are dimensioned insignificantly smaller than the distancing elements 9 in the embodiment shown here. This undersizing makes possible a self-retaining pressing in of the distancing elements 9 into the bearing mat 5.

The distancing elements 9 and the bearing mat 5 are formed as separate components. Likewise, it is essentially possible to integrate the distancing elements 9 into the bearing mat 5. In particular, then, when the bearing mat 4 is formed as a web, in particular, as a wire web, the distancing elements 9 can be connected particularly simply with the bearing mat 5. In addition, the assembly of the multi-bed catalyzer 1 is thereby simplified.

The gap 8 between the two monoliths that is made available with the aid of the distancing elements 9, and in consideration of its dimensions, can be required for a selected type of use, for example, for an exhaust probe 14, which is designated in FIG. 1 by a non-continuous line. Such an exhaust probe 14 can operate, for example, as an oxygen probe, which can be used in the frame of a so-called "on-board diagnosis". For receiving such an exhaust probe 14, the multi-bed catalyzer 1 is equipped here with a suitable pivoting connection 15, which is secured to the housing 2 in the area of the gap 8, in particular, by welding. In order to simplify the attachment of the pivoting connection 15 to the housing 2, a flat plateau 16 can be formed on the housing 2 in the area of the gap 8, on which the pivoting connection 15 attaches with a flat front side and can be connected with the housing 2, in particular, by means of a fillet weld. With this embodiment, the bearing mat 5 has a suitable recess 17 in the form of a radial opening in the area of the pivoting connection 15. The exhaust probe 14 radially projects into this recess 17. The recess 17 makes possible an ordered operation of the exhaust probe 14.

FIGS. 5 and 6 each show a detail of the bearing mat 5 in the area of one of the recesses 13 with spacer 9 inserted into it. The view here is in the direction of the longitudinal center axis 12 of the monolith 3, 4. In these special embodiments, the spacers 9 also have a T section when seen in this direction. Accordingly, with these spacers 9, the respective spacer section 10 has a projection 19 protruding in a circumferential direction of the monolith 3, 4 represented by a double arrow 18, on both sides, protruding above the mounting section 11 adjacent to the spacer section 10 in the peripheral direction 8. The dimensions of these projections 19 are selected so that they extend over the recess 13 at its edge in the peripheral direction 18 when the respective spacer element 9 is inserted into the particular recess 13. This design ensures a form-fitting mounting of the respective spacer element 9 on the bearing mat 5, at least in the installed state, when the respective mounting section 11 likewise extends beyond the monoliths 3, 4 at the edges. Then in the installed state, the projections 19 are in radial contact with the bearing mat 5 such that the outsides of the projections 19 situated on the exterior radially come to rest against an inside of the bearing mat 5 on the inside radially in the edge area of the recess 13.

The projections 19 may essentially be shaped in any way, but expediently in such a way as to yield the desired form-fitting fixation of the respective spacer element 9 on the bearing mat 5 in the installed state. In the embodiment according to FIG. 5, the spacer section 10 is lengthened easily in the circumferential direction 18 to form the projections 19, in the variant according to FIG. 6 the projections 19 are designed so that they taper in the peripheral direction. To this end, the projections 19 are provided here with a slope 20 on the inside radially dropping toward the bearing mat 15.

With the help of the projections 19, assembly of the multi-bed catalyzer 1 is simplified. For example, the recesses 13 may be designed to be slightly larger than in FIGS. 5 and 6 and used as the mounting sections 11 for the assembly.

Assembly of the multi-bed catalyzer 1 may be performed as follows, for example:

In an unrolled flat condition, the bearing mat 5 is assembled with the spacer elements 9. In other words, the spacer elements 9 with their mounting sections 11 are inserted into the recesses 13 on the inside radially of the bearing mat 5. Then at least one of the monoliths 3, 4 is placed on the bearing mat 5. When the monolith 3, 4 is unrolled, the bearing mat 5 is at the same time wound up onto the outside circumference of the monolith 3, 4. In doing so, the mounting sections 11 come to rest on the outside radial circumference of the monolith 3, 4, so that the spacer elements 9 are held in a form-fitting manner, namely radially toward the inside by the form-fitting connection between the monolith (3, 4) and the mounting section (11) and radially to the outside by the form-fitting connection between the projections 19 and the bearing mat (5).

The invention claimed is:

1. A multi-bed catalyzer for an exhaust system of a combustion engine, in particular, of a motor vehicle,
    with a housing (2), in which at least two catalytic monoliths (3, 4) are arranged axially adjacent and are arranged to be axially flowed-through with current in succession,
    wherein the two monoliths (3, 4) are encased on a circumferential side by a common heat-resistant bearing mat (5) and are supported by means of the bearing mat (5) in the housing (2),
    wherein axially between the two monoliths (3, 4) at least two heat-resistance distancing elements (9) are arranged to be circumferentially distributed, wherein the monoliths are axially supported on one another by means of the distancing elements (9); and
    wherein the distancing elements (9) are supported radially outward on the housing (2); and
    wherein the bearing mat (5) for each distancing element (9) has a recess (13), wherein a respective distancing element (9) is arranged in each recess (13) and wherein each distancing element (9) extends axially between the monoliths (3, 4) radially inward from a respective recess (13).

2. The multi-bed catalyzer according to claim 1,
    wherein the distancing elements (9) are formed respectively by means of a wire web made from a heat-resistant wire.

3. The multi-bed catalyzer according to claim 1,
    wherein the distancing elements (9) are arranged radially outward and extend radially inward with a distancing section (10) axially between the monoliths (3, 4).

4. The multi-bed catalyzer according to claim 3,
    wherein the distancing elements (9) respectively have a retaining section connecting to the distancing section (10), wherein the retaining section (11) engages at least one of the monoliths (3, 4) radially outward in an axial direction.

5. The multi-bed catalyzer according to claim 4,
    wherein the monoliths (3, 4) support the distancing elements (9) radially in the housing (2) by means of the retaining sections (11).

6. Multi-bed catalyzer at least according to claim 4,
    wherein when there is at least one distancing element (9), the distancing section (10) on at least one side has a projection (19) which protrudes in the circumferential direction (18) above the retaining section (11).

7. Multi-bed catalyzer according to claim 6,
    wherein the projection (19) tapers in the circumferential direction.

8. Multi-bed catalyzer according to claim 6,
    wherein in the installed state, at least one of the projections (19) is in radial contact with the bearing mat (5).

9. The multi-bed catalyzer according to claim 1,
    wherein the distancing elements (9) have an L-shaped or T-shaped axial cross section.

10. The multi-bed catalyzer according to claim 1,
    wherein the distancing elements (9) are formed as circular arc sections with reference to a longitudinal center axis (12) of the monoliths (3, 4).

11. The multi-bed catalyzer according to claim 1,
    wherein the distancing elements (9) are integrated in the bearing mat (5).

12. The multi-bed catalyzer according to claim 1,
    wherein the bearing mat (5) and the distancing elements (9), respectively, are formed as webs from a heat-resistance material and are connected with one another.

13. The multibed catalyzer according to claim 1,
    wherein in an axial section, the housing (2) has a pivoting connection (15) in which the two monoliths (3, 4) are axially spaced from one another by means of the distancing elements (9), wherein the pivoting connection (15) is suitable for connecting an exhaust probe.

14. The multi-bed catalyzer according to claim 13,
    wherein on the housing (2) in a region of the pivoting connection (15), a flat plateau (16) is formed, wherein the pivoting connection (15) is mounted on the flat plateau (16).

15. The multi-bed catalyzer according to claim 13,
    wherein the bearing mat (5) has a recess (17) in a region of the pivoting connection (15), wherein an exhaust probe (14) can project radially into the recess (17).

16. Multi-bed catalyzer according to claim 1,
    wherein at least one of the projections (19) is dimensioned so that in the installed state, it extends at the edge over the recess (13) in the circumferential direction (18).

* * * * *